US007813006B2

(12) United States Patent
Liu et al.

(10) Patent No.: US 7,813,006 B2
(45) **Date of Patent: *Oct. 12, 2010**

(54) ENHANCEMENT OF GLOSSMARK IMAGES AT LOW AND HIGH DENSITIES WITH SELECTIVE APPLICATION OF CLEAR TONER

(75) Inventors: Chu-Heng Liu, Penfield, NY (US); Shen-Ge Wang, Fairport, NY (US); Beilei Xu, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 450 days.

This patent is subject to a terminal disclaimer.

(21) Appl. No.: 11/949,307

(22) Filed: Dec. 3, 2007

(65) Prior Publication Data

US 2008/0079971 A1 Apr. 3, 2008

Related U.S. Application Data

(62) Division of application No. 10/876,001, filed on Jun. 24, 2004, now Pat. No. 7,352,493.

(60) Provisional application No. 60/529,187, filed on Dec. 12, 2003.

(51) Int. Cl.
*H04N 1/405* (2006.01)
*H04N 1/52* (2006.01)
*B41M 3/10* (2006.01)

(52) U.S. Cl. ...................... 358/3.06; 358/3.2; 358/3.28; 358/534

(58) Field of Classification Search .................. 358/1.9, 358/3.06, 3.2, 3.27, 3.28, 534, 536; 283/90, 283/91, 113; 399/341, 342
See application file for complete search history.

(56) References Cited

U.S. PATENT DOCUMENTS

| | | | |
|---|---|---|---|
| 3,784,289 | A | 1/1974 | Wicker |
| 4,149,194 | A | 4/1979 | Holladay |
| 4,210,346 | A | 7/1980 | Mowry, Jr. et al. |
| 4,310,180 | A | 1/1982 | Mowry, Jr. et al. |
| 5,087,507 | A | 2/1992 | Heinzer |
| 5,234,783 | A | 8/1993 | Ng |
| 5,487,567 | A | 1/1996 | Volpe |
| 5,583,660 | A | 12/1996 | Rylander |

(Continued)

FOREIGN PATENT DOCUMENTS

| | | |
|---|---|---|
| EP | 0 859 506 A1 | 8/1998 |

(Continued)

*Primary Examiner*—Scott A Rogers
(74) *Attorney, Agent, or Firm*—Fay Sharpe LLP

(57) ABSTRACT

The present invention relates to expanding the range of image densities over which the manipulation of differential gloss as may be inherent in halftoned images may be achieved. By selectively applying halftones with anisotropic structure characteristics which are significantly different in orientation while remaining identical in density, a gloss image may be superimposed within an image without the need for special toners or paper. This technique may be enhanced across low and high density areas by application of clear toner to expand the range of image densities over which a desired glossmark image will bear an effect.

14 Claims, 3 Drawing Sheets

U.S. PATENT DOCUMENTS

| | | | |
|---|---|---|---|
| 5,678,133 | A | 10/1997 | Siegel |
| 5,695,220 | A | 12/1997 | Phillips |
| 5,710,636 | A | 1/1998 | Curry |
| 5,734,752 | A | 3/1998 | Knox |
| 5,751,432 | A | 5/1998 | Gwaltney |
| 5,788,285 | A | 8/1998 | Wicker |
| 5,853,197 | A | 12/1998 | Mowry, Jr. et al. |
| 6,108,512 | A | 8/2000 | Hanna |
| 6,606,168 | B1 | 8/2003 | Rylander |
| 6,714,320 | B1 | 3/2004 | Nakahara et al. |
| 6,763,121 | B1 | 7/2004 | Shaked et al. |
| 6,906,825 | B1 | 6/2005 | Nakahara et al. |
| 7,020,349 | B2 | 3/2006 | Brunk |
| 7,092,128 | B2 | 8/2006 | Wang et al. |
| 7,126,721 | B2 | 10/2006 | Wang et al. |
| 7,139,101 | B2 | 11/2006 | Loce et al. |
| 7,139,521 | B2 | 11/2006 | Ng et al. |
| 7,148,999 | B2 | 12/2006 | Xu et al. |
| 7,180,631 | B2 | 2/2007 | Ide et al. |
| 7,180,635 | B2 | 2/2007 | Wang et al. |
| 7,193,751 | B2 | 3/2007 | Wang et al. |
| 7,301,675 | B2 * | 11/2007 | Wang et al. ................ 358/3.06 |
| 7,304,770 | B2 * | 12/2007 | Wang et al. ................ 358/3.06 |
| 2005/0025333 | A1 | 2/2005 | Funii et al. |
| 2005/0031160 | A1 | 2/2005 | Shaked et al. |
| 2005/0128523 | A1 | 6/2005 | Liu et al. |
| 2005/0135851 | A1 | 6/2005 | Ng et al. |
| 2005/0286083 | A1 | 12/2005 | Wang et al. |
| 2006/0044617 | A1 | 3/2006 | Wang et al. |
| 2006/0072159 | A1 | 4/2006 | Eschbach et al. |
| 2006/0127117 | A1 | 6/2006 | Eschbach et al. |
| 2007/0139714 | A1 | 6/2007 | McElvain |

FOREIGN PATENT DOCUMENTS

| | | | |
|---|---|---|---|
| EP | 1 705 529 | A1 | 9/2006 |
| EP | 1 705 531 | A1 | 9/2006 |
| GB | 2 217 258 | A | 10/1989 |

* cited by examiner

310

| | | | | | |
|---|---|---|---|---|---|
| 16 | 15 | 11 | 3 | 4 | 8 |
| 12 | 18 | 13 | 7 | 1 | 6 |
| 10 | 14 | 17 | 9 | 5 | 2 |

TYPE-A SUB-CELL

320

| | | | | | |
|---|---|---|---|---|---|
| 11 | 15 | 16 | 8 | 4 | 3 |
| 13 | 18 | 12 | 6 | 1 | 7 |
| 17 | 14 | 10 | 2 | 5 | 9 |

TYPE-B SUB-CELL

ENHANCEMENT OF GLOSSMARK IMAGES AT LOW AND HIGH DENSITIES WITH SELECTIVE APPLICATION OF CLEAR TONER

CROSS-REFERENCE TO RELATED APPLICATIONS

This application is a divisional of U.S. application Ser. No. 10/876,001 filed on Jun. 24, 2004 by the same inventors, and claims priority therefrom and there-through to the U.S. Provisional Application No. 60/529,187, filed Dec. 12, 2003, upon which it is based, and thereby also the disclosure provided therein by both which is totally incorporated herein by reference. Cross-reference is made to the following applications, the disclosures of each of which are totally incorporated by reference herein: U.S. Pat. No. 7,180,635, entitled "HALFTONE IMAGE GLOSS CONTROL FOR GLOSSMARKS" to inventors Shen-ge Wang, Beilei Xu, and Chu-heng Liu; U.S. Pat. No. 7,092,128 entitled "APPLICATION OF GLOSSMARKS FOR GRAPHICS ENHANCEMENT" to inventors Shen-ge Wang, Beilei Xu, and Chu-heng Liu; U.S. Pat. No. 7,148,999 entitled "VARIABLE GLOSSMARK" to inventors Beilei Xu, Shen-ge Wang, and Chu-heng Liu. The appropriate components and processes of the above co-pending applications may be selected for the disclosure of the present application in embodiments thereof.

CLAIM OF PRIORITY TO PROVISIONAL APPLICATION

This application claims the benefit of U.S. Provisional Application No. 60/529,187, filed Dec. 12, 2003, the disclosure of which is totally incorporated herein by reference.

BACKGROUND AND SUMMARY

The present invention relates generally to the gloss inherent in the hardcopy of image data be it pictorial or text. More particularly, this invention relates to halftoned image data and the control of differential gloss when that halftone image data is printed into hardcopy.

It is desirable to have a way to protect against the copying of a document. Most desirably in a manner that part of the content can be readily observed by a human reader but not by a copier scanner. One approach is where an image is printed using clear toner or ink, creating a difference in reflected light and diffused light that can be discerned by a human reader by holding the paper at an angle, but can not be detected by a copier scanner which is restricted to reading at right angles to the page.

There has been a need for a printer that can print a page that can be read but not copied. One method, described in U.S. Pat. Nos. 4,210,346 and 5,695,220 is to use a particular white toner and a particular white paper that are designed to have different diffused light characteristics at different angles. Of course, this system requires special, matched paper and toner.

In U.S. Pat. No. 6,108,512 to Hanna, the invention described discloses a system for producing non-copyable prints. In a xerographic printer, text is printed using clear toner. Thus, the only optical difference between toner and non-toner portions of the page is in the reflectivity. The plastic toner will reflect more light than the paper. A human reader can now read the image by holding the page at such an angle that the eye will intercept the reflected light from the toner, producing a contrast between the lighter appearing toner and the darker appearing paper. However, a copier scanner is always set up to avoid reflected light, by supplying light at an oblique angle and reading at a right angle. In this case, the diffused light is approximately equal for both toned and untoned surfaces, the scanner will detect no difference and the copier will not be able to copy the original.

Another approach taken to provide a document for which copy control is provided includes digital watermarking. As an example in U.S. Pat. No. 5,734,752 to Knox, there is disclosed a method for generating watermarks in a digitally reproducible document which are substantially invisible when viewed including the steps of: (1) producing a first stochastic screen pattern suitable for reproducing a gray image on a document; (2) deriving at least one stochastic screen description that is related to said first pattern; (3) producing a document containing the first stochastic screen; (4) producing a second document containing one or more of the stochastic screens in combination, whereby upon placing the first and second document in superposition relationship to allow viewing of both documents together, correlation between the first stochastic pattern on each document occurs everywhere within the documents where the first screen is used, and correlation does not occur where the area where the derived stochastic screens occur and the image placed therein using the derived stochastic screens becomes visible.

All of the above are herein incorporated by reference in their entirety for their teaching.

A further problem extant the teachings provided in U.S. Pat. No. 7,180,635 entitled "HALFTONE IMAGE GLOSS CONTROL FOR GLOSSMARKS" and incorporated above, is that the rendering of a desired glossmark image is most effective in halftone regions of the print of a primary image where the halftone structures in the primary image can be changed significantly without visual density/color change. In solid coverage (100%) and highlight (low density) regions, the manipulable gloss differential is weak or near zero.

Therefore, as discussed above, there exists a need for an arrangement and methodology which will control gloss and allow manipulation for glossmark hardcopy while improving and expanding the range of workable densities over which the glossmark image technique will be effective for a given primary image. Included in this need is the desirability of generating an image which may not be readily copied yet is readily discernable as such to the unaided observer. Thus, it would be desirable to solve this and other deficiencies and disadvantages as discussed above, with an improved methodology for the manipulation of inherent gloss.

The present invention relates to a method for the manipulation of the differential gloss as may be inherent in a halftone image comprising the steps of selecting a first halftone having a first anisotropic structure orientation, and then selecting a second halftone having a second anisotropic structure orientation different from the first halftone. The first halftone being applied to at least one portion of the halftone image, and the second halftone being applied to the remaining portions of the halftone image. This is followed by applying a clear toner to some portion of a hardcopy output of the halftone image resulting from the above steps.

In particular, the present invention relates to a method for the manipulation of the perceived gloss in a halftone image comprising the steps of selecting a first halftone having an anisotropic structure orientation, selecting a second halftone having a second anisotropic structure orientation different from the first halftone, applying the first halftone to at least some portion of the halftone image, and applying the second halftone to the remaining portion of the halftone image. The method also comprises applying a low density pattern of a light color to all low density areas in the halftone image.

The present invention also relates to a method for the manipulation of the perceived gloss in a halftone image comprising the steps of selecting a first halftone having a first anisotropic structure orientation, selecting a second halftone having a second anisotropic structure orientation different from that of the first halftone. The steps which follow entail applying the first halftone to at least some portion of the halftone image, applying the second halftone to another portion of the halftone image, and applying an under-color to all high density areas in the halftone image.

DETAILED DESCRIPTION

By proper utilization of the perceived differential gloss inherent between various anisotropic halftone dot structures, the desired manipulation of perceived gloss and the generation of glossmarks via that differential gloss may be achieved without the need for special paper or special toners or inks. However, that teaching, as is provided herein below, by its very nature relies upon some toner or ink upon a page for effectiveness. As the technique entails manipulation of the gloss inherent in toner/ink as applied to a media/paper, it directly follows that a given desired glossmark image will be manifest only in those areas where some toner/ink is deposited. Very low density areas such as background areas and highlights will display minimal to zero differential gloss effect, rendering any desired glossmark image placed thereupon invisible due to that absence of gloss, as is in turn due to the absence of toner.

At an opposite toner/ink scenario, where the image is fully saturated and thus requires complete toner coverage, the anisotropic halftone dot gloss structure is lost because halftone dot is fully "on". Thus the anisotropic gloss structure is lost to full saturation. Here again, due to the zero differential gloss in affect, any desired glossmark image placed in any such area thereupon is rendered invisible due to the absence of any anisotropic gloss differential. Thus for best effect, a desired glossmark image is best superimposed over those in-between image areas which are neither very low density, nor very high density. It is to the expansion of this range of workable densities to which the disclosure provided herein below is directed.

Figure 1:
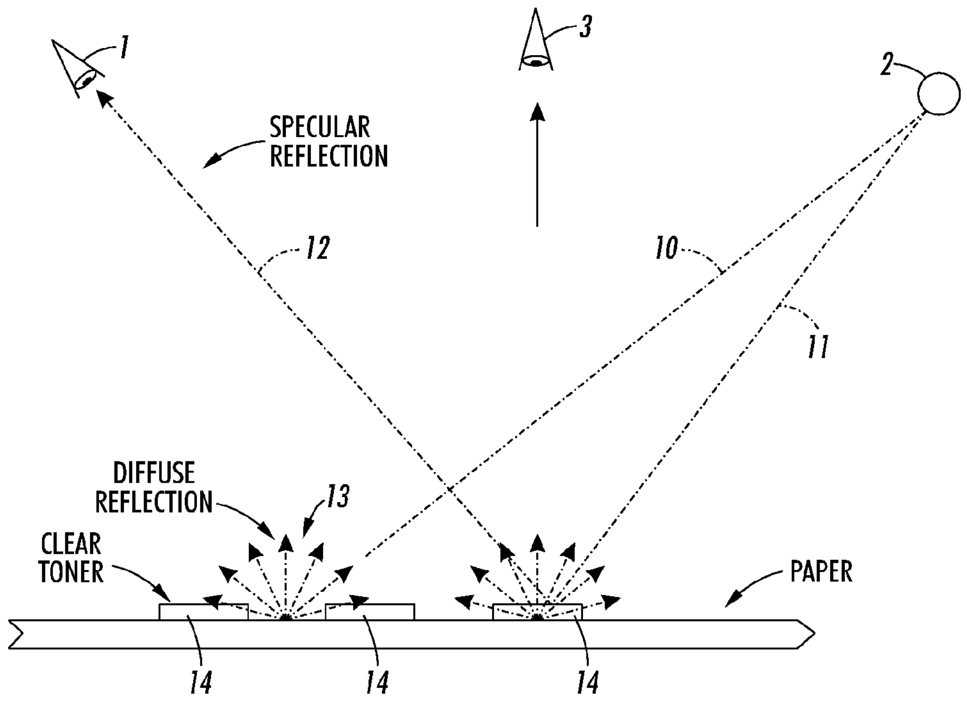
FIG. 1 (PRIOR ART)
FIG. 1 shows how the human eye can detect a large difference between the glossy portions of the page but a scanner detector cannot.

FIG. 1 shows how the human eye 1 can read gloss upon the page and a scanner cannot. Three glossy areas 14 are shown. One ray of light 10 from the light source 2 hits the paper at a point where there is no gloss toner 14, and the reflected light 13 is diffused so that there is only a small amount of light in all directions, including the direction toward the human eye 1. Another ray of light 11 of equal intensity touches the paper at a point where there is gloss toner 14. Here, there is a large amount of reflected light 12 in the indicated direction. If the human eye 1 is positioned as shown, a large difference between glossy and non-glossy toner areas is readily observable by the human eye 1. However, the scanner 3 reads incident light at right angles to the paper. In this case, there is only a small amount of diffused light coming from both the glossy and non-glossy dots, and the scanner can not detect a difference. This is one manner for creating a gloss image which cannot be scanned by conventional copiers and scanners.

Figure 2:
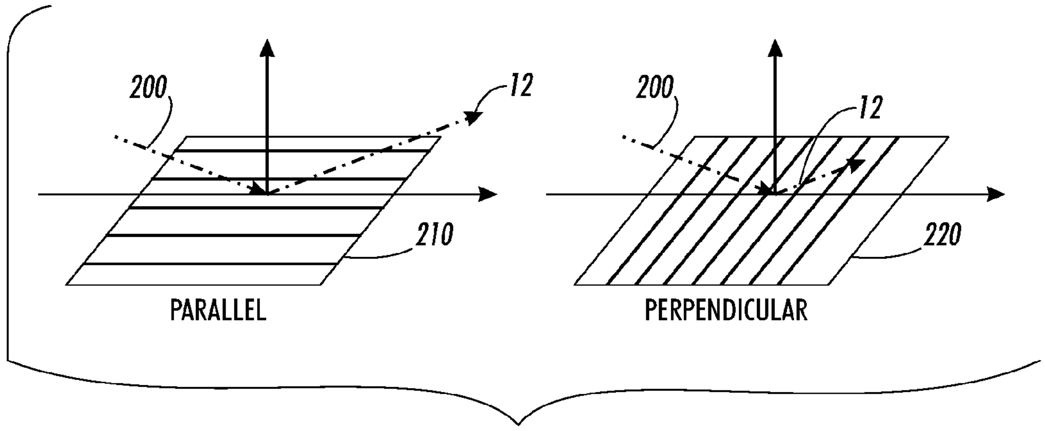
FIG. 2 depicts a differential gloss found in simple line-screen halftones.

Heretofore, there has been little appreciation for the fact that the inherent reflective and diffusive characteristics of halftones may be manipulated to be directive of incident light as about an azimuth by use of a halftone structure which is anisotropic in nature. A mirror is equally reflective regardless of the azimuth of the light source relative to the plane of the mirror. Similarly, an ordinary blank paper is equally reflective and diffusive regardless of the azimuth of the light source. However, printed matter can and will often display differing reflective and diffusive characteristics depending upon the azimuth of origin for a light source relative to the structural orientation of the halftone. Such reflective characteristics when maximized are exhibited in a halftone with a structure which is anisotropic in nature. In other words, the indicatrix used to express the light scattered or reflected from a halftone dot will maximally vary depending upon the halftone dot's azimuth orientation to the light source when that halftone has an anisotropic structure. FIG. 2 provides an example of what is meant by anisotropic structure.

In FIG. 2, a simple line-screen halftone of anisotropic nature is presented in two orientations relative to impinging incident light 200, a parallel orientation 210, and a perpendicular orientation 220. Both halftone dot orientations are selected to be similar in density so that the diffuse light and incident light at orthogonal angles to the paper are equal. In this way, the light which is available to scanner 3 or to the human eye from straight on is the same. However, the specular reflected light 12 is considerably greater for the anisotropic parallel orientation 210. If as printed, a mass of the 210 parallel orientation halftones are butted directly adjacent to a mass of 220 perpendicular orientation halftones, there will be a difference in reflected light between them, which when viewed from an angle will be perceived as a shift in gloss differential or a glossmark image. The perceptibility of this gloss differential will be maximized when the halftone anisotropic orientations are 90 degrees apart as shown here in FIG. 2.

Figures 3, 4:
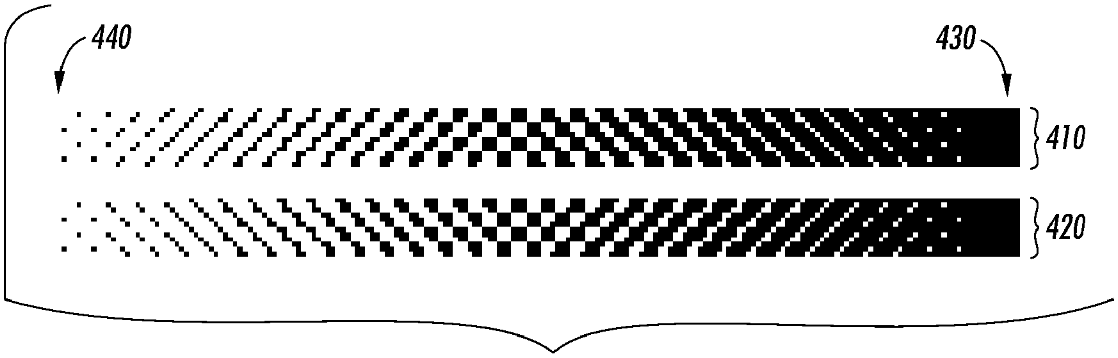
FIG. 3 shows two 3×6 halftone patterns suitable in anisotropic structure to produce discernable gloss differential for practicing the present invention.
FIG. 4 is a density sweep of the two halftone patterns of FIG. 3.

FIG. 3 shows example halftone cells suitable for a skilled practitioner to employ in an embodiment employing the teachings of the present invention. They are but one useful example as will be evident to those skilled in the art. Each halftone cell is comprised as a three by six pixel array. The turn on/off sequence is numerically indicated. Note the diagonal orientation of the pixel numbering. The type-A sub-cell 310 and type-B sub-cell 320 both have a 45 degree orientation, one to the right and the other to the left. This orientation can be clearly seen in the density sweeps 410 and 420 of FIG. 4. To maximize the perceptibility of the gloss differential, the orientations of sub-cells type-A and type-B are arranged 90 degrees apart one from the other.

Figure 5:
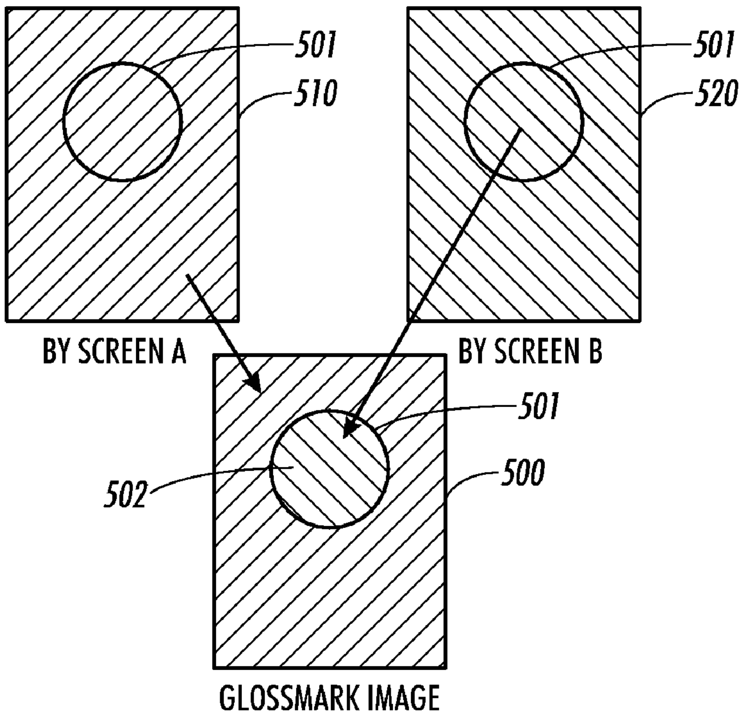
FIG. 5 depicts a patchwork alternating of the two halftone patterns of FIG. 3 so as to achieve a glossmark.

FIG. 5 depicts a glossmark image 500 achievable using halftone cells as described above. Screen-A 510 uses one halftone cell type and screen-B 520 uses the other. The circle 501 is provided as a visual aid across the image screens 500, 510 and 520. The desired glossmark image here is for a sphere 502 to be perceived in the midst of image 500. Screen-A 510 provides the field of right diagonal oriented anisotropic halftones and screen 520 provides the spherical area of left diagonal oriented anisotropic halftone cells. In this manner, a selection of the two screen types are patch-worked together to create the glossmark image 500.

Figure 6:
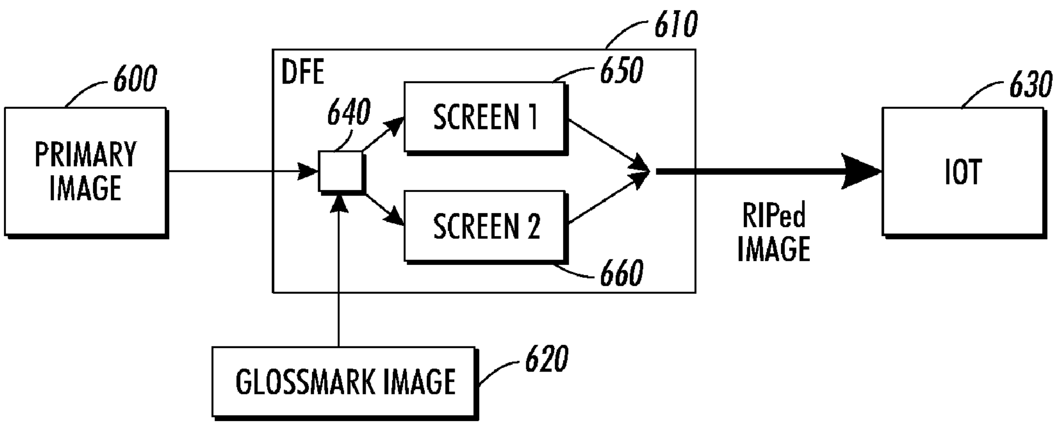
FIG. 6 shows one embodiment for achieving the image directed alternation of the halftone patterns for glossmarks as depicted in FIG. 5, utilizing the halftone patterns of FIG. 3.

An another approach for the assembly of a glossmark image is diagramed in FIG. 6. Here, the primary image 600 is received as input data to the digital front-end (DFE) 610 as is normal. However, a desired glossmark image 620 is also received as input data to the DFE 610 as well. The processed image as sent to the image output terminal (IOT) 630 is gray-scaled, the halftone density being driven by the primary image 600 data as is normal. However, the halftone type selection is driven by the intended glossmark image data 620 as input to multiplexer switch 640. The intended glossmark image data 620 will serve to direct a portion of the primary image 600 to use a first anisotropic structured halftone while directing an alternative halftone to be used for the remainder of primary image 600. As will be understood by those skilled in the art, the intended glossmark image data 620 may be flattened into simple zero and one pixel data representations if needed in the DFE 610. This pattern of zero and ones are then used to toggle the multiplexer 640 to one halftone anisotropic structure orientation type or the other. Multiplexer 640 therefore toggles between either screen 1 type halftone 650 or screen 2 halftone type 660, as dictated by the desired glossmark data 620, to produce the composite result of raster input processed (RIP) image data as passed to the IOT 630. In this way, a superimposition of a pattern 620 is imbedded into the primary image 600 which can only be perceived as a gloss differential glossmark picture.

By alternating between two halftone types, carefully selected such that each has identical matching density characteristics while displaying distinctly different anisotropic structure orientations will enable the super imposition of a glossmark image without the need for special toners or paper. This manipulation of gloss differentials will, of course, be best utilized with toner/ink and substrate systems which themselves best display inherent gloss characteristics. Examples of such systems comprise electrostaticgraphic and quality ink-jet systems. While wax based systems typically have less inherent gloss, they may well prove amendable to techniques which increase their inherent gloss. In just such a scenario, the teachings herein are anticipated to apply such wax based systems as well. It will be appreciated by those skilled in the art that these teachings will apply to both monochromatic, black and white, as well as color images and upon plain paper, glossy paper or transparencies. Those skilled in the art will also understand that this manipulation of inherent anisotropic gloss differential standing alone will be weak where either there is a solid black area (solid toner/ink) or a white and therefore toner-less/ink-less area. That is because these areas will not best exhibit the anisotropic structures of the selected halftones.

As discussed above the rendering of a desired glossmark image can only be made effective in those halftone regions in the print of a primary image where the halftone structures in the primary image can be changed significantly without visual density/color change. In solid coverage (100%) 430 and highlight (low density) 440 (see FIG. 4) regions, the glossmark print contrast is weak or near zero. In these regions, one exemplary approach to take is to employ a clear toner which is superimposed as proscribed by desired glossmark image 620 to create clear toner structures without affecting the visual density/color of the existing primary images. The technique in one embodiment comprises application of the clear toner method of U.S. Pat. No. 6,108,512 incorporated above, in combination with the anisotropic halftone dot manipulation of differential gloss as taught above and in related patent application Ser. No. 10/159,423 referenced above. The clear toner is applied so as to be coincident with one of the selected anisotropic halftone screens. For example, in FIG. 5, the clear toner may be applied to cover and be coincident with the edges of circle 501 in image 500. This technique is very effectively used to compliment and enhance the glossmark print to create a more nearly uniform differential gloss contrast across the whole of primary image 600 density/color ranges. In a further alternative it may be superimposed in a manner proscribed by an alternative image mark other than, and even distinctly different from, the desired glossmark image 620 to create artistic effects or enhancements to the final hardcopy print.

Color hardcopy systems present additional opportunities for improving the density range over which the manipulation of inherent gloss to effectuate glossmark prints will operate. One such other approach for enhancing the glossmark print across the low density primary image color range is to employ a color such as yellow, light cyan, light magenta etc, in low density areas, applied as a low density pattern so as to be minimally noticeable visually to the human observer. A light cast of yellow in low density and high-light image areas has been found to be acceptable, while greatly enhancing the glossmark gloss differential realized in those areas of the hardcopy output. This improvement is simply by virtue of there being toner which by action of halftoning can provide some modicum of differential gloss when manipulated by the techniques described above.

A further approach to enhancing the glossmark print across the high density primary image color range is to employ the addition of an under-color such as for example, cyan covered with solid black in the high density areas. The visual effect remains the desired pure black, but the underlying cyan halftone structure when so used will modify the gloss when manipulated by the techniques described above. This is especially true for an imaging process where black is the top layer on the document in a color system. Determination of the high density areas to be so treated may be achieved with simple thresholding, or by various segmentation techniques or other means as would be apparent to those skilled in the art.

While the embodiments disclosed herein are preferred, it will be appreciated from this teaching that various alternative modifications, variations or improvements therein may be made by those skilled in the art. For example, it will be understood by those skilled in the art that the teachings provided herein may be applicable to many types of halftone cell types and arrangements including selecting more than two different halftone structures, as well being applicable to many types of toner/ink and substrate types. All such variants are intended to be encompassed by the claims which follow. These claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A method for the manipulation of the differential gloss in a halftone image comprising the steps of:

selecting a first halftone having a first anisotropic structure orientation;

selecting a second halftone having a second anisotropic structure orientation different from that of the first halftone;

applying the first halftone to at least some portion of the halftone image;

applying the second halftone to the remaining portion of the halftone image; and, applying a clear toner so as to be coincident with the portion to which the first halftone is applied, of a hardcopy output of the halftone image resulting from the above steps.

2. The method of claim 1 wherein the first anisotropic structure orientation and the second anisotropic structure orientation are 90 degrees apart.

3. The method of claim 2 wherein the first anisotropic structure has a parallel orientation and the second anisotropic structure has perpendicular orientation.

4. The method of claim 2 wherein the first anisotropic structure has a 45 degree orientation to the right and the second anisotropic structure has a 45 degree orientation to the left.

5. The method of claim 1 wherein the first anisotropic structure orientation and the second anisotropic structure orientation are less than 90 degrees apart.

6. The method of claim 1 wherein the clear toner is applied, in the alternative, substantially coincident with the second halftone instead of the first halftone.

7. The method of claim 1 wherein the clear toner is applied to the same portions of the halftone image as the second halftone is applied to instead of the first halftone.

8. A method for the manipulation of the differential gloss in a halftone image comprising the steps of:

selecting a first halftone having a first anisotropic structure orientation;

selecting a second halftone having a second anisotropic structure orientation different from that of the first halftone;

applying the first halftone to at least some portion of the halftone image;

applying the second halftone to the remaining portion of the halftone image; and, applying a clear toner so as to be substantially coincident with the at least some portion of the halftone image to which the first halftone is applied, to a hardcopy output of the halftone image resulting from the above steps.

9. The method of claim 8 wherein the first anisotropic structure orientation and the second anisotropic structure orientation are 90 degrees apart.

10. The method of claim 9 wherein the first anisotropic structure has a parallel orientation and the second anisotropic structure has perpendicular orientation.

11. The method of claim 9 wherein the first anisotropic structure has a 45 degree orientation to the right and the second anisotropic structure has a 45 degree orientation to the left.

12. The method of claim 8 wherein the first anisotropic structure orientation and the second anisotropic structure orientation are less than 90 degrees apart.

13. The method of claim 8 wherein the clear toner is applied, in the alternative, substantially coincident with the second halftone instead of the first halftone.

14. The method of claim 8 wherein the clear toner is applied to the same portions of the halftone image as the second halftone is applied to, instead of the portions the first halftone is applied to.

* * * * *